US011626692B1

(12) United States Patent
Amini et al.

(10) Patent No.: US 11,626,692 B1
(45) Date of Patent: Apr. 11, 2023

(54) CONNECTORS WITH AUDIBLE FEEDBACK AND CONTACT PROTECTION

(71) Applicant: Apple Inc., Cupertino, CA (US)

(72) Inventors: Mahmoud R. Amini, Sunnyvale, CA (US); George Tziviskos, San Jose, CA (US); Bartley K. Andre, Palo Alto, CA (US); Ayoub Yari Boroujeni, San Jose, CA (US); James E. Harper, Paso Robles, CA (US); Davood Mousanezhad Viyand, Cupertino, CA (US); Rui Zhou, Sunnyvale, CA (US); Daniel A. Bergvall, San Jose, CA (US); Nikhil S. Pansare, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/485,121

(22) Filed: Sep. 24, 2021

(51) Int. Cl.
*H01R 13/62* (2006.01)
*H01R 13/641* (2006.01)
*H01R 12/87* (2011.01)
*H01R 12/73* (2011.01)

(52) U.S. Cl.
CPC ........... *H01R 13/641* (2013.01); *H01R 12/87* (2013.01); *H01R 12/73* (2013.01)

(58) Field of Classification Search
CPC .... G06K 13/08; H01R 13/633; H01R 13/635; G60K 13/0806
See application file for complete search history.

(56) References Cited

U.S. PATENT DOCUMENTS

| RE35,938 | E * | 10/1998 | O'Brien | G06K 13/08 |
| | | | | 439/153 |
| 8,052,444 | B1 * | 11/2011 | McMahon | H01R 13/635 |
| | | | | 439/258 |
| 8,662,907 | B1 * | 3/2014 | Lin | G06K 13/08 |
| | | | | 439/159 |
| 9,478,900 | B1 * | 10/2016 | Juds | H01R 13/53 |
| 9,859,654 | B1 * | 1/2018 | Abee | H01R 13/635 |

\* cited by examiner

*Primary Examiner* — Phuong Chi Thi Nguyen
(74) *Attorney, Agent, or Firm* — Kilpatrick Townsend & Stockton LLP

(57) ABSTRACT

Connector receptacles that can provide audible feedback to inform a user that a card has been properly inserted, and can include structures to protect contacts in a connector receptacle from damage due to an improper card insertion. An example can provide a connector receptacle having a click module to provide audible feedback indicating that a card has been fully inserted. Another example can provide a connector receptacle having movable contacts that can remain out of an insertion path until the card is at least partially inserted.

20 Claims, 12 Drawing Sheets

CONNECTORS WITH AUDIBLE FEEDBACK AND CONTACT PROTECTION

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors, adapters, and others, have become ubiquitous.

These electronic devices can include one or more connector receptacles. These connector receptacles can be configured to receive a second electronic device or a connection to a second electronic device. For example, connector receptacles can be arranged to receive memory cards such as a Secure Digital cards, memory sticks, compact flash, wireless transceivers, and other types of cards and modules. Connector receptacles can also be arranged to receive a connector insert, which can be connected to a second electronic device through a cable.

These connector receptacles can be placed on a back or side of an electronic device. In this position, it can be can be difficult for a user to insert a card or other electronic device into a connector receptacle. Thus, it can be desirable that a connector receptacle to provide an audible feedback that informs a user as to when a card or other electronic device has been properly inserted.

These devices have become smaller and slimmer with each succeeding generation. As a result, it can be desirable to reduce a depth of their connector receptacles. But when a connector receptacle is made shallower, its contacts can be more vulnerable to damage by improper card or connector insertion. Accordingly, it can be desirable that these connector receptacles have protective structures for connector contacts.

Thus, what is needed are connector receptacles that can provide audible feedback to inform a user that a card has been properly inserted, as well as include structures to protect contacts in a connector receptacle from damage due to an improper card insertion.

SUMMARY

Accordingly, embodiments of the present invention can provide connector receptacles that can provide audible feedback to inform a user that a card has been properly inserted, as well as include structures to protect contacts in a connector receptacle from damage due to an improper card insertion.

An illustrative embodiment of the present invention can provide a connector receptacle having a click module to provide audible feedback indicating that a card has been fully inserted. The connector receptacle can have a housing. The housing can include a passage having a front opening to accept a card or other electronic device. A number of contacts can be supported by the housing and can have contacting portions in the passage for forming electrical connections with contacts on the card when the card is inserted in the passage. The click module can be located at an end of the passage opposite the front opening.

The click module can include a plunger and a deflecting element. The plunger can have a plunger head to engage the deflecting element, a handle having a first end attached to the plunger head and a second end attached to an axis, where the plunger can rotate about the axis. The deflecting element can be a dome spring or other element. As a card inserted into the passage engages the click module, the plunger can rotate about the axis. The plunger head can push into the deflecting element, deforming the deflecting element from an original position to a deflected position, thereby generating audible feedback indicating that the card has been fully inserted. After the card is removed, the deflecting element can return to the original position, thereby generating audible feedback indicating that the card has been removed.

These and other embodiments of the present invention can provide a connector receptacle having movable contacts that can remain out of an insertion path until a card is at least partially inserted. The connector receptacle can have a housing. The housing can include a passage having a front opening to accept a card or other electronic device. A first row of contacts can be supported by the housing. The first row of contacts can have contacting portions for forming electrical connections with corresponding contacts on the card when the card is inserted in the passage. The contacting portions of the first row of contacts can remain out of the passage until the card is partially inserted into the passage. Once the card is sufficiently inserted into the passage, the first row of contacts can move such that the contacting portions of the first row of contacts can engage corresponding contacts on the card. A second row of contacts can be supported by the housing. The second row of contacts can have contacting portions for forming electrical connections with corresponding contacts on the card when the card is inserted in the passage.

In these and other embodiments of the present invention, the moving contacts can be moved by a contact protection mechanism. The contact protection mechanism can include a cam that is rotated by a lever that can engage a leading edge of a card as the card is inserted into the passage. The cam can be generally oblong and can engage each of the first row of contacts. Initially a narrow dimension of the cam can engage each of the first row of contacts, allowing contacting portions of the first row of contacts to remain out of the passage. As a card is inserted and the cam is rotated by the lever, a wider dimension of the cam can engage each of the first row of contacts, thereby pushing the contacting portions of the first row of contacts into the passage where they can form electrical connections with corresponding contacts on the card.

The components of these connector receptacles can be formed of various materials. For example, the contacts, shields spring plates, deflecting elements, and their constituent parts and other conductive portions of these connector receptacles can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as the various housings, plungers, contact protection mechanisms, and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesives can be a pressure sensitive adhesive, heat activated film, epoxy, or other adhesive. Boards can be flexible circuit boards or printed circuit boards. Boards can be formed of FR-4 or other material.

Embodiments of the present invention can provide connector receptacles that can be located in, and can connect to, various types of devices, such as portable computing devices, tablet computers, desktop computers, laptops, all-in-one computers, wearable computing devices, cell phones, smart phones, media phones, storage devices, portable media players, navigation systems, monitors, displays, power supplies, adapters, remote control devices, chargers, and other devices. These connector receptacles can provide pathways for signals and power for cards or other modules, such as Ultra-High-Speed II Secure Digital cards, Secure Digital cards, Secure Digital High Capacity cards, Secure Digital Extended Capacity cards, Secure Digital Ultra-High-Capacity I cards, Secure Digital Ultra-High-Capacity II cards, memory sticks, compact flash cards, communication modules, and other devices and modules that have been developed, are being developed, or will be developed in the future. These connector receptacles can provide pathways for signals that are compliant with various standards such as Universal Serial Bus (USB), High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
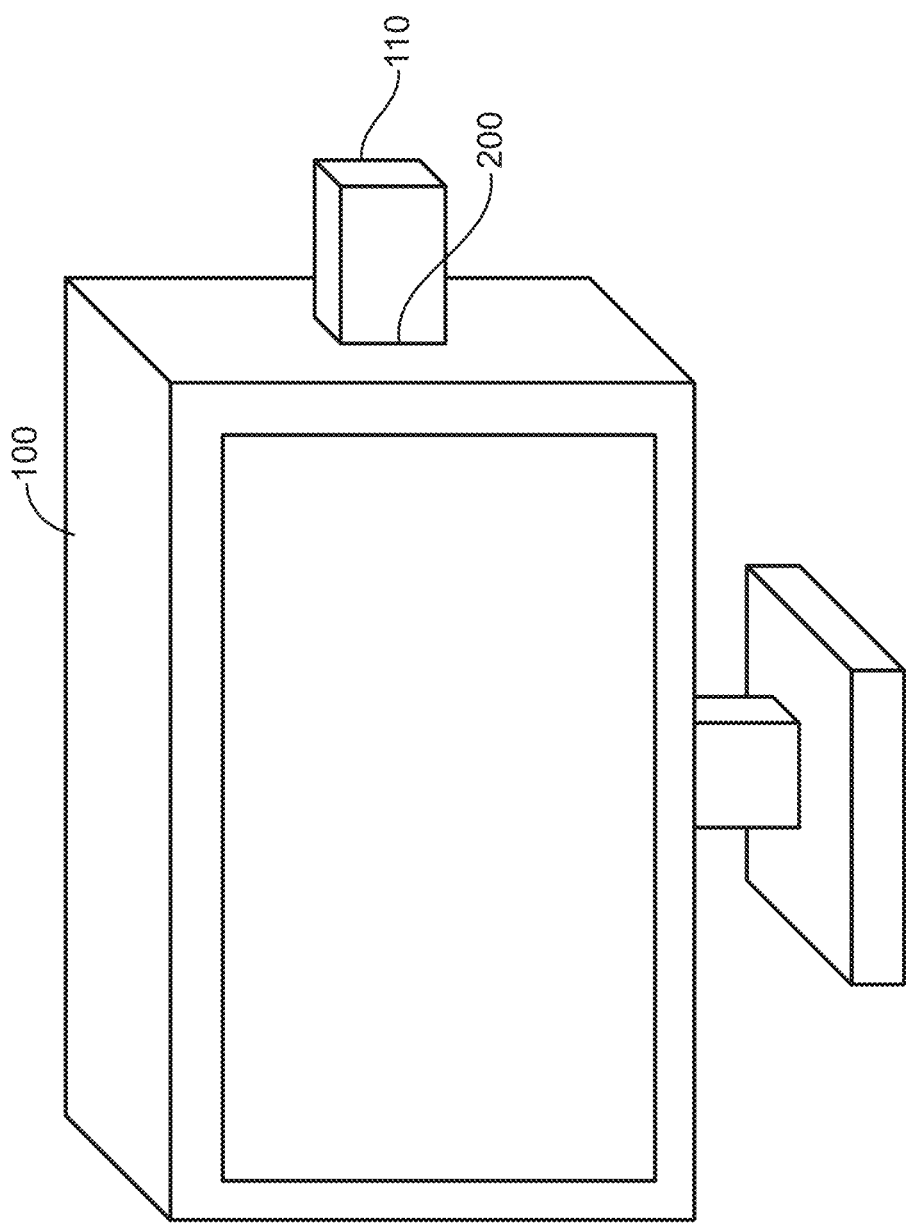
FIG. 1 illustrates an electronic device according to an embodiment of the present invention.

FIG. 1 illustrates an electronic device according to an embodiment of the present invention. This figure, as with the other included figures, is shown for illustrative purposes and does not limit either the possible embodiments of the present invention or the claims.

Electronic device 100 can be a monitor or an all-in-one computer. Other types of electronic devices, such as portable media players, storage devices, tablets, netbooks, laptops, desktops, wearable computing devices, cell, media, and smart phones, televisions, monitors and other display devices, portable computing devices, navigation systems, and other types of devices can also be improved by the incorporation of embodiments of the present invention.

In this example, card 110 can be inserted into connector receptacle 200 located in the housing of electronic device 100. In a specific embodiment of the present invention, connector receptacle 200 can be arranged to receive a Secure Digital memory card 110. In other embodiments of the present invention, connector receptacle 200 can be configured to receive other types of memory cards or electronic devices, modules, or connections to other electronic devices, such as a cable or docking station insert. These and other devices can be referred to collectively as cards.

Connector receptacle 200 can be located on a side or rear of electronic device 100. At this location, it can be difficult for a user to reach connector receptacle 200 to insert card 110 or other device or connection. A user can have difficulty telling when card 110 is fully inserted in connector receptacle 200. Accordingly, embodiments of the present invention can provide connector receptacles 200 capable of providing audible feedback to a user indicating that card 110 is fully inserted in connector receptacle 200. Examples are shown below in FIG. 2 through FIG. 8.

Also, it can be desirable to reduce the space inside electronic device 100 that is consumed by connector receptacle 200. By shrinking the space consumed by connector receptacle 200, electronic device 100 can be made smaller, can include additional functionality, or both.

In various embodiments of the present invention, the space consumed by connector receptacle 200 can be reduced by reducing its depth. But reducing the depth of connector receptacle 200 can lead to potential vulnerabilities. For example, a user can incorrectly insert card 110. That is, a user can incorrectly insert card 110 at an oblique angle relative to the connector receptacle 200. Because connector receptacle 200 is shallow, contacts 920 (shown in FIG. 9) in connector receptacle 200 can be relatively close to the surface of the enclosure of electronic device 100. When a user inserts card 110 improperly, a corner or edge of card 110 can strike one or more contacts 920 at an angle, thereby possibly causing damage. Accordingly, embodiments of the present invention can provide connector receptacles having protective features for contacts in a connector receptacle. Examples are shown below in FIG. 9 through FIG. 12.

Figure 2:
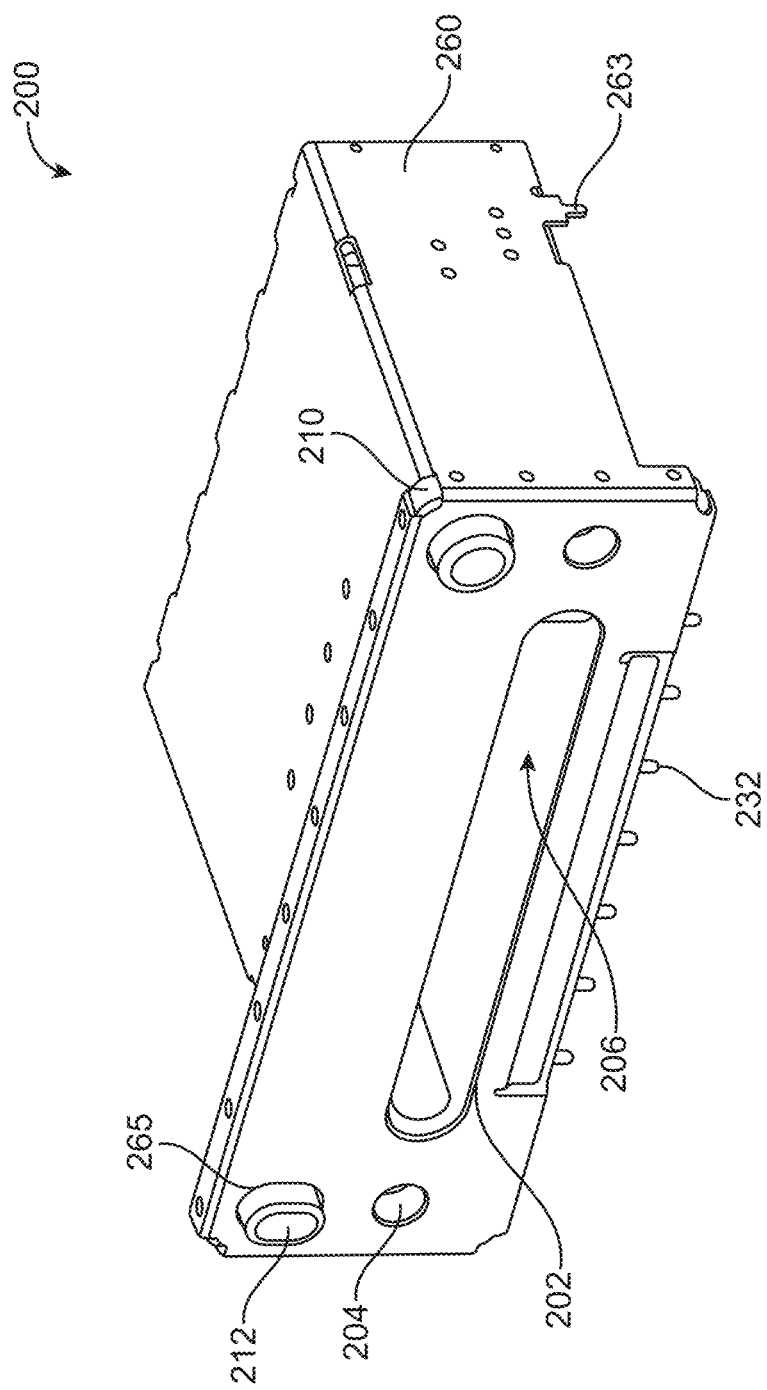
FIG. 2 illustrates a connector receptacle according to an embodiment of the present invention.

FIG. 2 illustrates a connector receptacle according to an embodiment of the present invention. Connector receptacle 200 can include housing 210. Housing 210 can include passage 206 forming front opening 202. Housing 210 can be shielded by shield 260. Shield 260 can include tabs 263. Housing 210 can support contacts 230 and contacts 220 (both shown in FIG. 4.) Contacts 230 can terminate in through-hole contacting portions 232. Through-hole contacting portions 232 and tabs 263 can be inserted into openings in a printed circuit board or other appropriate substrate (not shown.) Housing 210 can further include alignment features including tabs 212, which can pass through the openings 265 in shield 260. These alignment features can further include openings 204. Tabs 212 can align with corresponding openings (not shown) in a device enclosure (not shown) housing connector receptacle 200. Openings 204 can accept corresponding tabs (not shown) of the device enclosure housing connector receptacle 200.

Figure 3:
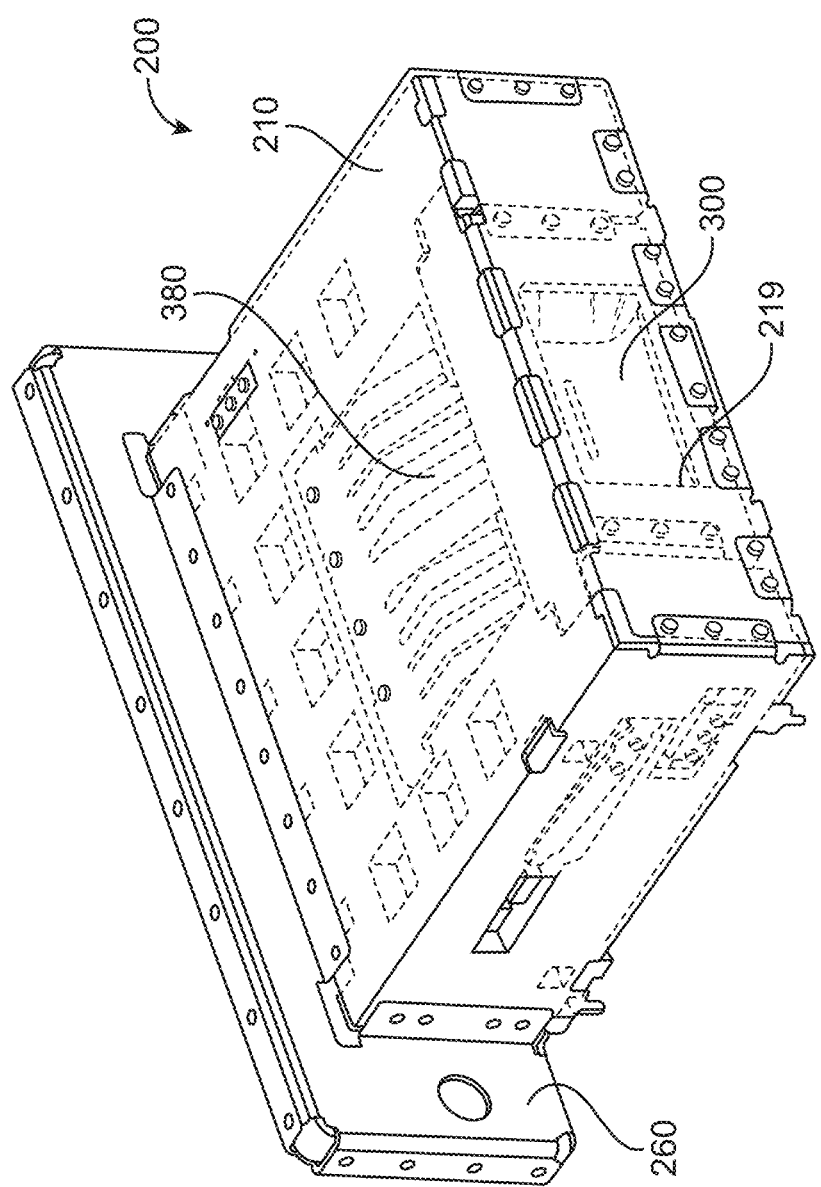
FIG. 3 illustrates a rear view of the connector receptacle of FIG. 2.

FIG. 3 illustrates a rear view of the connector receptacle of FIG. 2. Housing 210 can be shielded by shield 260. Housing 210 can include opening 219. Click module 300 can be positioned in opening 219 of housing 210. Housing 210 of connector receptacle 200 can support top spring 380. Top springs 380 can help to guide card 500 (shown in FIG. 5) in passage 206 (shown in FIG. 4) to ensure that card 500 engages click module 300 as card 500 is fully inserted. Top springs 380 can also be used in connector receptacle 900 (shown in FIG. 9) to help card 1100 (shown in FIG. 11) or card 1200 (shown in FIG. 12) to ensure those cards engage click module 300, lever 954 of contact protection mechanism 950, or similar component.

Again, click module 300 can be located in opening 219 of housing 210. Alternatively, a housing (not shown) for click module 300 can be formed as a portion of housing 210. That is, components for click module 300, such as plunger 310 and deflecting element 320, can be located in a portion of housing 210.

Figure 4:
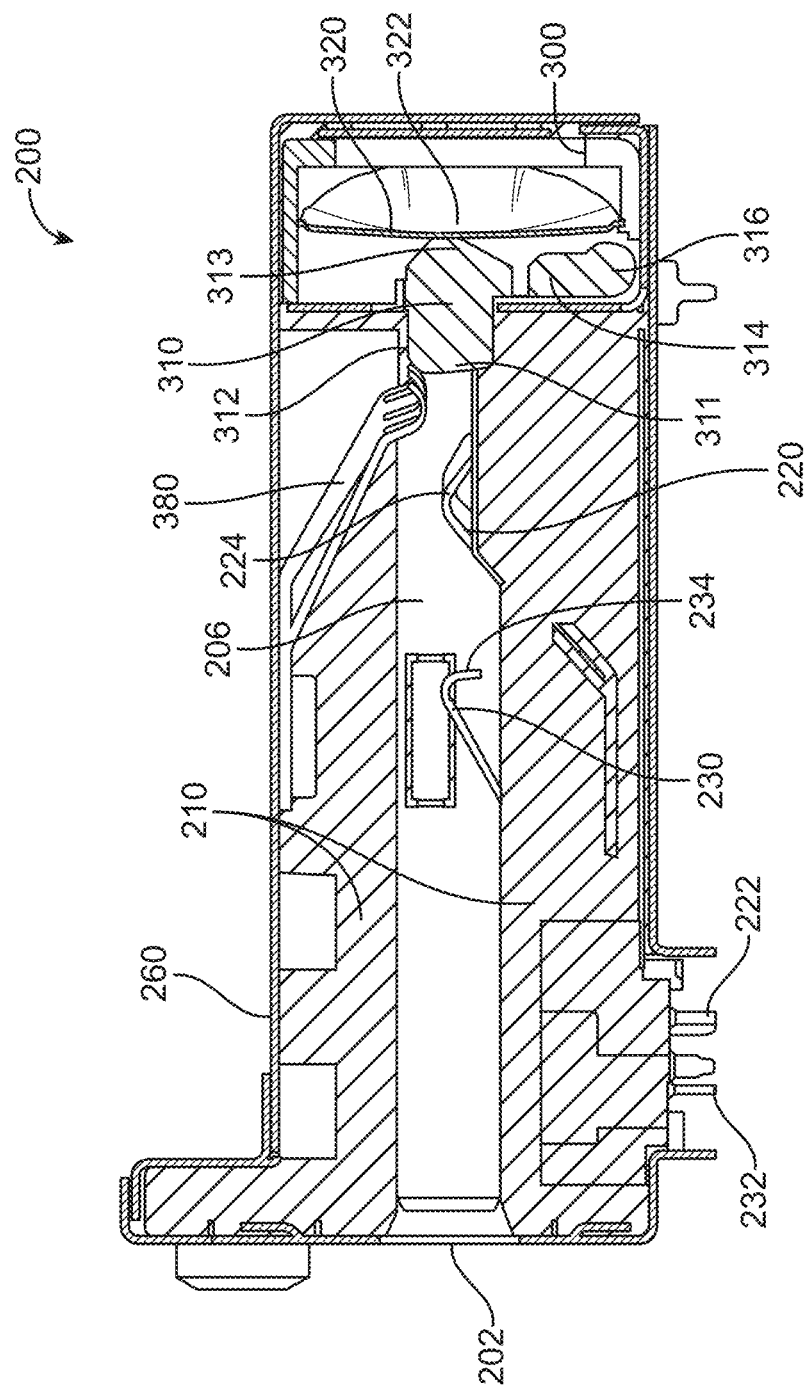
FIG. 4 illustrates a cutaway side view of a connector receptacle of FIG. 2.

FIG. 4 illustrates a cutaway side view of a connector receptacle of FIG. 2. Connector receptacle 200 can include housing 210 having passage 206 forming front opening 202. Passage 206 can be configured to accept card 500 (shown in FIG. 5) or other electronic device or connector insert. Housing 210 can be shielded by shield 260. Housing 210 can support a first row of contacts 220. Contacts 220 can include contacting portions 224 and can terminate in through-hole contacting portions 222. Housing 210 can support a second row of contacts 230. Contacts 230 can include contacting portions 234 and can terminate in through-hole contacting portions 232. Some or all of through-hole contacting portions 222 and through-hole contacting portions 232 can instead be surface-mount contacting portions (not shown.) Contacting portions 224 and contacting portions 234 can mate with, that is form electrical connections with, corresponding contacts (not shown) on card 500. Housing 210 can further support top springs 380. Top springs 380 can help to guide card 500 in passage 206 such that card 500 engages click module 300 as card 500 is fully inserted. Top springs 380 are particularly useful in positioning cards of different thicknesses, such as card 1100 (shown in FIG. 11A) and card 1200 (shown in FIG. 12A.)

Click module 300 can include plunger 310 and deflecting element 320. Plunger 310 can include plunger head 312 having a front surface 311 for engaging card 500 and a back surface 313 for engaging front surface 322 of deflecting element 320. Plunger 310 can further include handle 314. Handle 314 can be attached to plunger 310 at a first end and axel 316 at a second end. Plunger 310 can rotate about axel 316.

Figure 5:
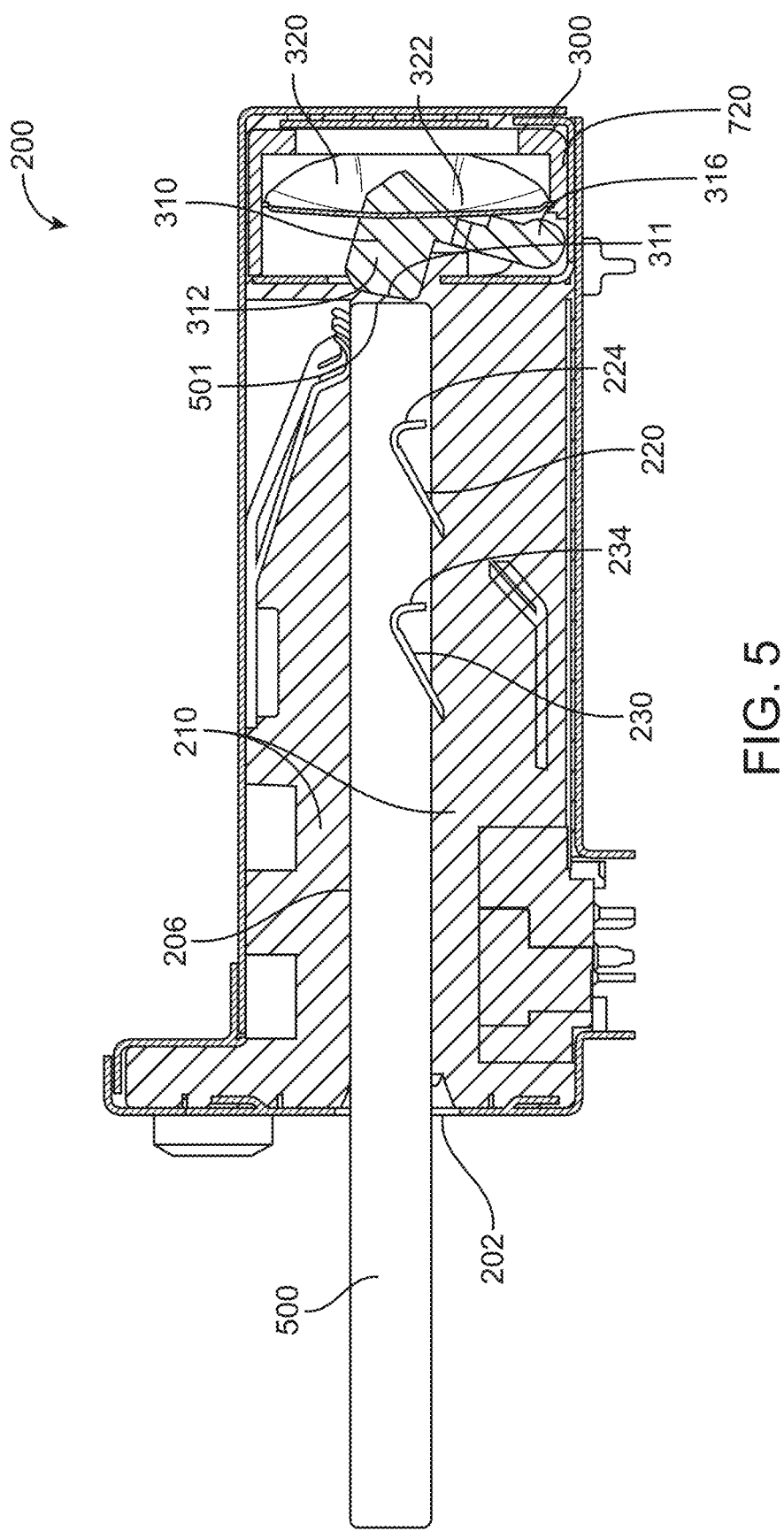
FIG. 5 illustrates a cutaway side view of the connector receptacle of FIG. 2.

FIG. 5 illustrates a cutaway side view of the connector receptacle of FIG. 2. Connector receptacle 200 can include housing 210 having passage 206 forming front opening 202. Card 500 can be inserted as shown into passage 206. As card 500 is inserted into passage 206 of connector receptacle 200, leading edge 501 of card 500 can engage front surface 311 of plunger head 312 of plunger 310. Continued insertion can cause plunger head 312 to rotate about axel 316, thereby causing back surface 313 of plunger head 312 to push into deflecting element 320 at front surface 322 of deflecting element 320. Deflecting element 320 can deform from its original shape to a deformed shape, thereby moving air inside click module 300 and generating an audible response. This audible response can have different volumes. For example, the audible response can be in the range of 50 dB. The audible response can be in the range of 60 dB. The audible response can be in the range of 70 dB. The audible response can be in the range of 80 dB. This audible response can inform a user or provide an indication that card 500 has been fully inserted into connector receptacle 200. The deflection of deflecting element 320 can further provide an amount of tactile feedback to a user, also indicating that card 500 has been fully inserted. When card 500 is fully inserted, contacts (not shown) on card 500 can form electrical connections with contacting portions 224 of contacts 220 and contacting portions 234 of contacts 230. Plunger head 312 can remain depressed, and deflecting element 320 can remain in its deflected shape.

As card 500 is extracted from passage 206 of connector receptacle 200, leading edge 501 of card 500 can withdraw from front surface 311 of plunger head 312. This withdrawal can allow deflecting element 320 to return to its original shape from its deflected shape. As before, this can cause air movement in click module 300, thereby generating an audible response indicating that card 500 is being extracted and that electrical connections between contacts on card 500 and contacting portions 224 of contacts 220 and contacting portions 234 of contacts 220 have been broken.

Again, click module 300 can provide an audible feedback to indicate that card 500 has been fully inserted in passage 206 of connector receptacle 200. In these and other embodiments of the present invention, click module 300 can provide one or more additional responses when card 500 has been fully inserted in passage 206 of connector receptacle 200. For example, click module 300 can provide an amount of tactile feedback to indicate that card 500 has been fully inserted in passage 206 of connector receptacle 200. In these and other embodiments of the present invention, click module 300 can provide an electrical signal to indicate that card 500 has been fully inserted in passage 206 of connector receptacle 200. For example, a first electrode (not shown) can be connected to deflecting element 320. A second electrode (not shown) can be attached to housing 720 of click module 300 or elsewhere, where the second electrode can physically contact deflecting element 320 when deflecting element 320 is deflected by plunger 310. A short or connection between the first electrode and second electrode can be detected when the deflecting element 320 is deflected by plunger 310, thereby providing an indication that card 500 has been fully inserted. This can simplify connector receptacle 200 by eliminating a separate insertion detection switch that might otherwise be needed.

In these and other embodiments of the present invention, plunger 310 can be formed of various ways. For example, plunger 310 can comprise a lever attached to a cam, where the lever rotates about the cam as card 500 is inserted and extracted. Examples are shown in FIG. 9 through FIG. 12 below. Deflecting element 320 can be implemented as a dome spring, a curved piece of metal or plastic, or other type of spring or other deformable structure.

Figure 6:
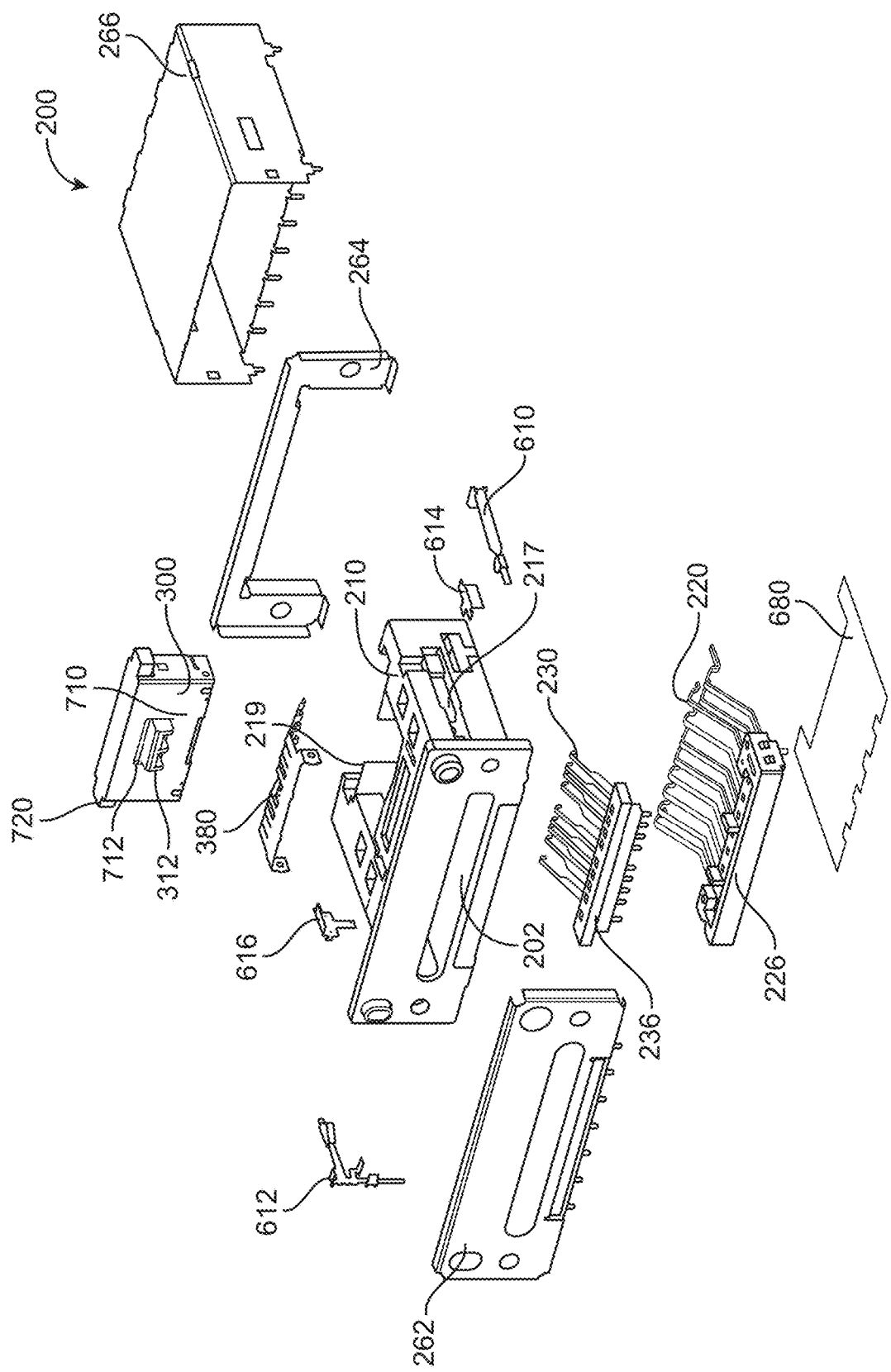
FIG. 6 is an exploded diagram of the connector receptacle of FIG. 2.

FIG. 6 is an exploded diagram of the connector receptacle of FIG. 2. Connector receptacle 200 can include housing 210. Housing 210 can include passage 206 (shown in FIG.

4) forming front opening 202 for card 500 (shown in FIG. 5) or other electronic device or connector insert. Housing 210 can be formed by injection molding or other type of molding. Housing 210 can be shielded by shield 260 (shown in FIG. 2.) Shield 260 can include front plate 262, backplate 264, and back shield 266. These shield portions can be electrically connected together, for example by soldering or spot or laser welding. Front plate 262, backplate 264, and back shield 266 can be formed by stamping or other process, and can be formed of stainless steel or other appropriate material.

Housing 210 can support a first row of contacts 220, which can be fixed together with housing 226. Housing 210 can also support a second row of contacts 230 which can be fixed together with housing 236. Housing 226 and housing 236 can be formed by insert molding or other type of molding. Housing 210, housing 226 and housing 236 can be formed of plastic, nylon, or other nonconductive material. Contacts 220 and contacts 230 can be formed by stamping, and can be formed of copper, stainless steel, or other appropriate material. Contacts 220 and contacts 230 can be plated with nickel, gold, or other appropriate material.

Adhesive layer 680 can be used to hold housing 226 and housing 236 in place relative to housing 210. Adhesive layer 680 can be a pressure-sensitive adhesive, polyimide films, heat-activated film, or other type of adhesive.

Retention spring 610, detect ground plate 614, spring 612, and ground plate 616 can fit in openings 217 in sides of housing 210. These features can detect a presence of card 500 in connector receptacle 200. These features can further help to hold and align card 500 in place in passage 206 of housing 210.

Click module 300 can be inserted in opening 219 of housing 210. Click module 300 can include shield 710. Shield 710 can include opening 712 for plunger head 312 of plunger 310 (shown in FIG. 4.) Plunger 310 and shield 710 can be supported by housing 720. Click module 300 can be a module that can be utilized in different products, such as other types of connector receptacles. Click module can be tested separately before insertion in opening 219 of housing 210. This can help to improve yields and simplify assembly and testing. In these and other embodiments of the present invention, click module 300 can be located in other places in connector receptacle 200. For example, click module 300 can be placed in a top, bottom, or side of passage 206. Click module 300 can be housed in a portion (not shown) of housing 210 instead of housing 720. Specifically, either or both shield 710 and housing 720 of click module 300 can be formed as part of housing 210 or other housing for connector receptacle 200. Further details of click module 300 are shown in the following figures.

Figure 7:
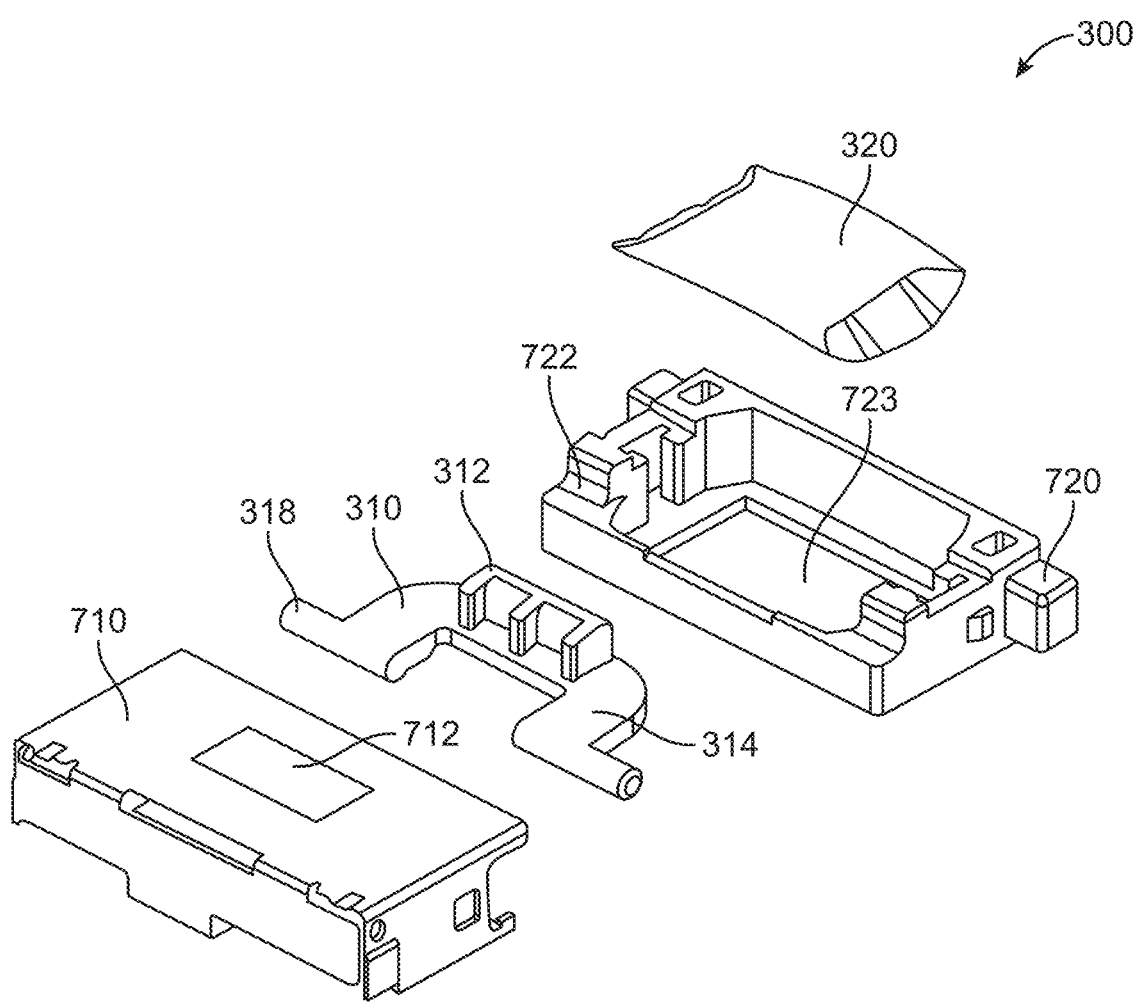
FIG. 7 is an exploded diagram of a click module according to an embodiment of the present invention.

FIG. 7 is an exploded diagram of a click module according to an embodiment of the present invention. Click module 300 can include housing 720. Housing 720 can include opening 723. Opening 723 can allow a passage of air as deflecting element 320 transitions between an original state and a deflected state. Opening 723 can allow the insertion of foam or other materials that can be used to adjust the volume of the click response provided by click module 300. Housing 720 can further include groove 722 for supporting axel 318 of plunger 310. Plunger 310 can include handle 314, which can be attached to plunger head 312 at a first end and axel 318 at a second end. In this specific example, plunger 310 having two handles 314 and two axels 318 are implemented. In these and other embodiments of the present invention, one, three, or more than three handles 314 and corresponding axels 318 can be used.

Housing 720 can support deflecting element 320. Deflecting element 320 can be a dome spring, a curved piece of metal or plastic, or other type of spring or other structure. Shield 710 can be attached to housing 720 to secure plunger 310 and deflecting element 320 in place. Shield 710 and housing 720 can protect deflecting element 320 from permanent deformation that could otherwise be caused by excessive force on card 500 (shown in FIG. 5) during insertion. Plunger 310 can be positioned between deflecting element 320 and shield 710. In this configuration, deflecting element 320 can preload plunger 310 against shield 710. This can help to prevent noise that could otherwise result when connector receptacle 200 (shown in FIG. 2) is moved causing plunger 310 to contact shield 710 and thereby make noise. Shield 710 can include opening 712 for plunger head 312. Alternatively, either or both shield 710 or housing 720 for click module 300 can be replaced with portions (now shown) of housing 210 (shown in FIG. 6.) These portions of housing 210 can include opening 712 for plunger head 312. These portions of housing 210 can include an opening similar to opening 723 as well.

Figure 8A:
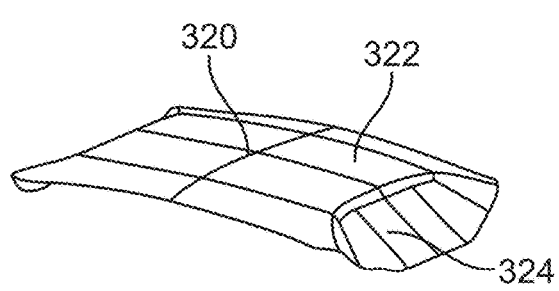
FIGS. 8A through 8E illustrate a deflecting element implemented as a dome spring according to an embodiment of the present invention.
Figure 8B:
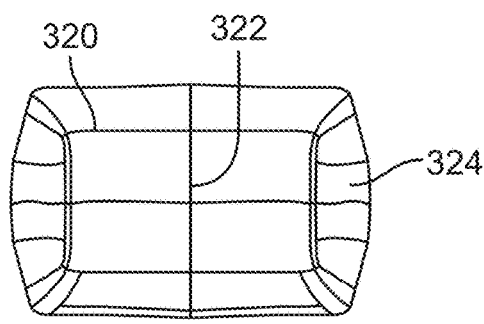
Figure 8C:
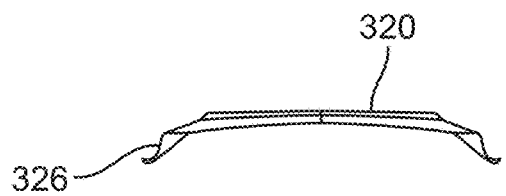
Figure 8D:
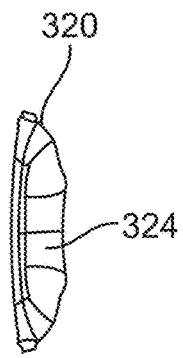
Figure 8E:
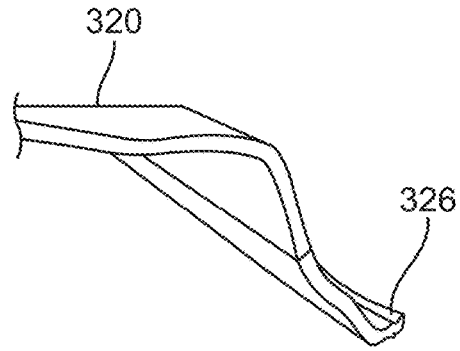

FIGS. 8A through 8E illustrate a deflecting element implemented as a dome spring according to an embodiment of the present invention. FIG. 8A shows deflecting element 320 having a front surface 322 for engaging with back surface 313 of plunger head 312 of plunger 310 (shown in FIG. 4.) Deflecting element 320 can further include tapered portions 324. Deflecting element 320 is shown in this example in its original position. Front surface 322 can be depressed, thereby inverting the illustrated curvature of front surface 322. This inversion or deflection can cause air movement in click module 300 (shown in FIG. 7), thereby providing an audible indication. FIG. 8B illustrates a top view of deflecting element 320. Front surface 322 can have tapered portions 324 on each of two lateral sides. FIG. 8C illustrates a cutaway side view of deflecting element 320. Deflecting element 320 can be supported by housing 720 (shown in FIG. 7.) A sharp edge of deflecting element 320 could wear away at housing 720. Accordingly, edges of deflecting element 320 can be folded back to generate rolled edges 326. This can help to protect housing 720 in click module 300 from wear. FIG. 8D illustrates a side view of deflecting element 320. This view illustrates tapered portion 324. FIG. 8E is a close-up view of a portion of deflecting element 320 illustrating rolled edges 326. Instead of rolled edges 326, other mitigations to avoid wear can be taken. For example, a piece of metal, such as stainless steel, can be placed between deflecting element 320 and housing 720.

Deflecting element 320 can have a longer width to take advantage of the width of connector receptacle 200 and passage 206, while having a shorter height. An increased length of tapered portions 324 can provide a louder, more robust click noise, though this might be limited to avoid deflecting element 320 being able to provide enough force to push card 500 (shown in FIG. 5) out of passage 206 (shown in FIG. 4.) The length of tapered portions 324 can also be adjusted to provide a desired force profile experienced by a user when inserting and extracting card 500. Other parameters or features of deflecting element 320 can be varied. Deflecting element 320 can be sufficiently resistant to being deflected that deflection due to the weight of plunger 310 (shown in FIG. 7) or normal mechanical vibration does not occur. Deflecting element 320 can be formed of stainless steel, copper, or other material. A thickness of deflecting element 320 can be varied, and other parameters can be adjusted as well.

Figure 9:
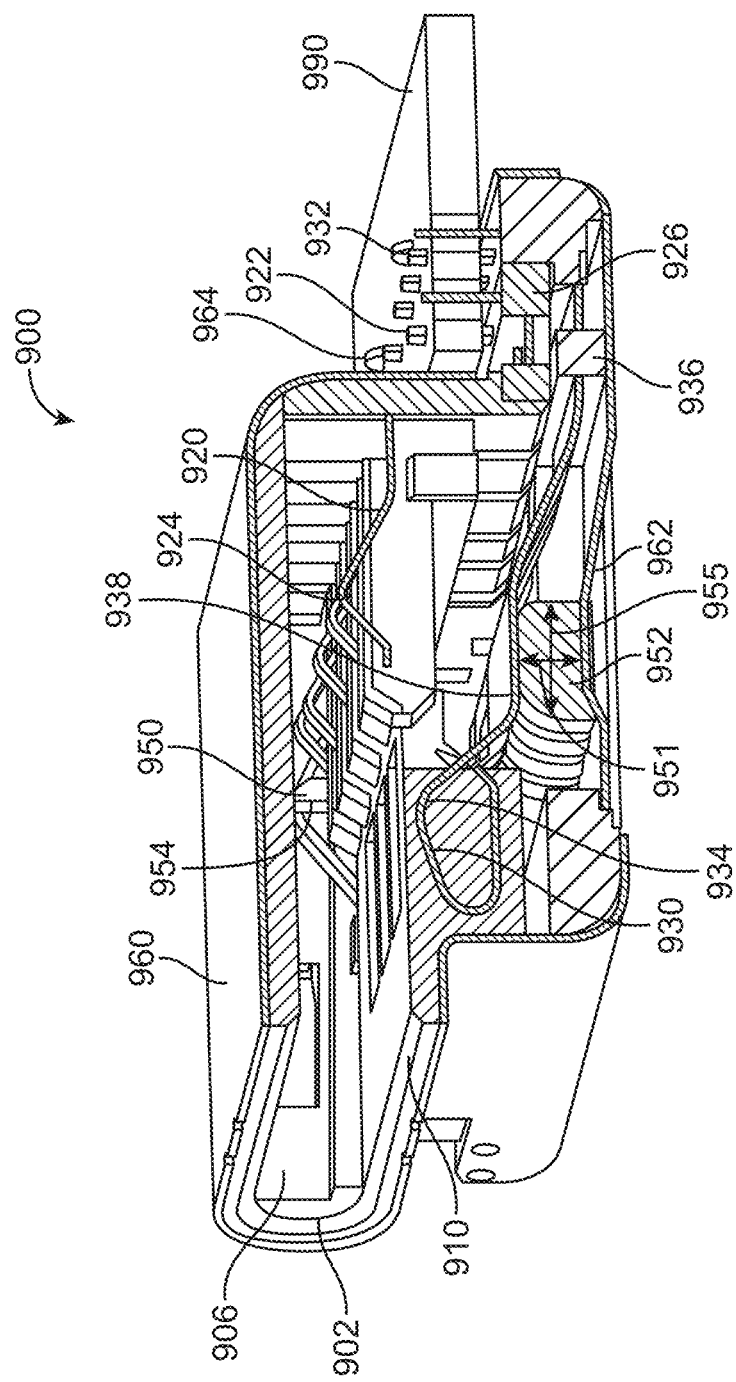
FIG. 9 is a cutaway side-view of another connector receptacle according to an embodiment of the present invention.

FIG. 9 is a cutaway side-view of another connector receptacle according to an embodiment of the present invention. Connector receptacle 900 can include housing 910. Housing 910 can be shielded by shield 960. Housing 910 can include passage 906 forming front opening 902. Housing 910 can support first row of contacts 920 and second row of contacts 930. Contacts 920 can include contacting portions 924, and contacts 930 can include contacting portions 934, for forming electrical connections with corresponding contacts (not shown) on card 1100 (shown in FIG. 11A) or card 1200 (shown in FIG. 12A.) Contacts 920 can be held together by housing 926. Contacts 930 can be held together by housing 936. Contacts 920 can terminate in through-hole contacting portions 922. Contacts 930 can terminate in through-hole contacting portions 932. In these and other embodiments of the present invention, some or all of through-hole contacting portions 922 and through-hole contacting portions 932 can be surface mount contacting portions (not shown.) Through-hole contacting portions 922 and through-hole contacting portions 932 can be soldered to traces at openings (not shown) in board 990. Shield 960 can include tabs 964 that can be soldered to ground planes to traces at openings (not shown) on board 990.

In some embodiments, particularly where connector receptacle is utilized in a compact electronic device, it can be desirable for connector receptacle 900 to have a shallow depth. This shallow depth can result in the placement of contacts 930 relatively close to front opening 902. If a card, such as card 1100, is improperly inserted in passage 906, one or more contacts 930 could be damaged. Accordingly, embodiments of the present invention can provide a contact protection mechanism 950. Contact protection mechanism 950 can protect contacts 930 by keeping them out of an insertion path, specifically passage 906, of card 1100 until card 1100 has been properly inserted a sufficient distance to ensure that damage to contacts 930 might not occur.

In these and other embodiments of the present invention, contact protection mechanism 950 can be implemented using cam 952 and lever 954. Lever 954 can be attached at one end to cam 952 and contact protection mechanism 950 can rotate about cam 952.

When a card is not inserted in passage 906, lever 954 can be in passage 906. With lever 954 in this position, cam 952 can be oriented to have its narrow dimension 951 between contact portion 938 and spring plate 962. This can allow contacting portions 934 of contacts 930 to remain out of passage 906 and protected by housing 910. As a thin card, such as card 1100, is inserted in passage 906, leading edge 1101 (shown in FIG. 11) of card 1100 can reach lever 954. Further insertion of card 1100 can push lever 954 away from front opening 902 and down, but perhaps not fully out of passage 906, thereby rotating cam 952 clockwise as drawn. As card 1100 is fully inserted, cam 952 can be oriented such that first wide dimension 953 (shown in FIG. 11A) of cam 952 can be between contact portions 938 and spring plate 962. When a thick card, such as thick card 1200 (shown in FIG. 12) is inserted into passage 906, lever 954 can be fully pushed out of passage 906 by leading edge 1201 (shown in FIG. 12) and cam 952 can be positioned such that a second wide dimension 955 of cam 952 is between contact portions 938 and spring plate 962. When either thickness of card is inserted, cam 952 can push contact portion 938 away from spring plate 962 and can move contacting portions 934 of contacts 930 into passage 906. Contacting portions 934 can form electrical connections with contacts on card 1100 in this position.

These and other embodiments of the present invention can accept thin cards, such as thin card 1100, or thick cards, such as thick card 1200. These different thicknesses can occur when various cards features, such as ribs, can be included or excluded. Also, there can be a range of manufacturing tolerances for card 1100 or card 1200. When a thick card, such as card 1200, is inserted in connector receptacle 900, card 1200 can push in a downward direction as drawn on contacting portions 934 of contacts 930. This action, combined with cam 952 forcing contact portions 938 of contacts 930 upward as drawn by second wide dimension 955, can provide stress on contacts 930. This stress could produce a permanent set or permanent deformation of contacts 930. Accordingly, embodiments of the present invention can implement spring plate 962 to reduce the stress on contacts 930.

Spring plate 962 can provide an amount of compliance to compensate for different thicknesses of card 1100 or card 1200 that might be inserted into passage 906. For example, a thick card, such as card 1200 can provide a downward force on contacting portions 934 of contacts 930. This force can translate to a force on contact portions 938. At the same time, cam 952 can be positioned such that second wide dimension 955 is between contact portions 938 and spring plate 962. These forces could permanently deform contacts 930. Accordingly, spring plate 962 can be included to provide an amount of compliance that can reduce the force on contact portions 938 and help to avoid permanent deformation. Specifically, spring plate 962 can compress, thereby lowering the position of contact portions 938 relative to contacting portions 934, thereby reducing stress on contacts 930. Spring plate 962 can provide a suspension for cam 952 and cam 952 can be referred to as a suspended cam. A thin card, such as card 1100 (shown in FIG. 11) can provide a reduced downward displacement of contacting portions 934 of contacts 930. Also, a thin card 1100 can position cam 952 to have first wide dimension 953 between spring plate 962 and contact portions 938. This can translate into a reduced force on contact portions 938 from cam 952. This reduced force can compress spring plate 962 a reduced amount.

The forces on contact portions 938 of contacts 930 when a thin card 1100 or thick card 1200 is inserted can be varied by varying the relative thicknesses of first wide dimension 953 and second wide dimension 955 of cam 952. The thicker second wide dimension 955 is, the greater the forces on contact portions 938 of contacts 930, and the more spring plate 962 is needed to compensate to avoid permanent deformation of contacts 930. Conversely, the narrower that second wide dimension 955 is, the lower the forces on contact portions 938 of contacts 930, and the less spring plate 962 is needed to compensate to avoid permanent deformation of contacts 930.

Accordingly, in these and other embodiments of the present invention, cam 952 can have a different cross-section. This cam can be implemented as cam 1052 below. When cam 1052 is employed, spring plate 962 might not be needed and cam 1052 can have a bottom surface that rests on a portion of housing 910. In these and other embodiments of the present invention, both cam 1052 and spring plate 962 can be implemented.

Cam 1052 can be shaped such that when no card is inserted in passage 906, lever 954 can be in passage 906 and a narrow dimension 1051 of cam 1052 can be between contact portion 938 and housing 910. When thin card 1100 is fully inserted in passage 906, a wide dimension 1053 of cam 1052 can be between contact portion 938 and housing 910. This wide dimension 1053 can be sufficient to lift contacting portions 934 into contact with contacts on card 1100. When thick card 1200 is fully inserted in passage 906, an intermediate dimension 1055 of cam 1052 can be positioned between contact portion 938 and housing 910. This intermediate dimension 1055 can be smaller than wide dimension 1053 and still sufficient to lift contacting portions 934 into contact with contacts on card 1200. This intermediate dimension 1055 of cam 1052 can position contact portions 938 lower than where contact portions 938 are when wide dimension 1053 of cam 1052 is between contact portions 938 and housing 910. This lower position can compensate for the lower position of contacting portions 934 of contacts 930 when thick card 1200 is inserted as compared to thin card 1100. This can result in similar stresses and forces being placed on contacts 930 when either a thin card 1100 or a thick card 1200 is inserted into passage 906 of connector receptacle 900. Cam 1052 can be referred to as a constant-stress cam for this reason.

With card 1100 or card 1200 in passage 906, contact portions 938 can exert a force on cam 952. Cam 952 can be shaped such that this force has a tendency to cause cam 952 to rotate counterclockwise as drawn. As long as card 1100 remains in passage 906, lever 954 can be positioned against a bottom side of card 1100, thereby preventing the rotation of cam 952. As card 1100 is extracted from passage 906, force provided by contact portions 938 on cam 952 can cause cam 952 to rotate counterclockwise as drawn. This can again place the narrow dimension 951 between contact portions 938 and spring plate 962. As a result, lever 954 can return to its upright position in passage 906 and contacting portions 934 of contacts 930 can return to their original position out of and below passage 906.

Lubricants can be applied to portions of cam 952, contacts 930, and other surfaces of connector receptacle 900 to facilitate the rotation of cam 952. These lubricants can be dry lubricants and can contain polytetrafluoroethylene or other lubricating particles. During assembly, contact portions of 936 can be deburred to reduce friction with cam 952.

Figure 10A:
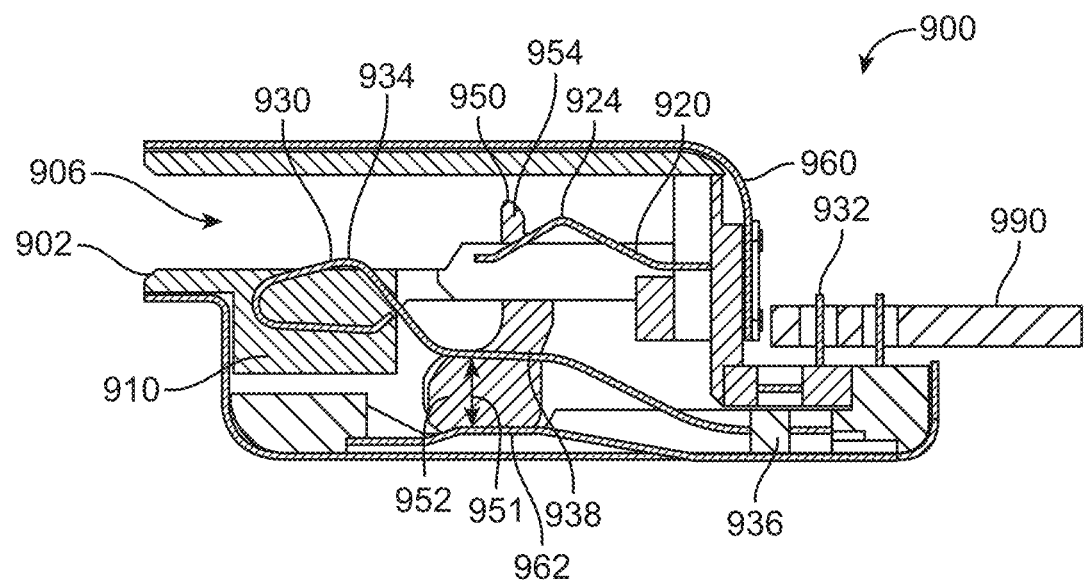
FIG. 10A and FIG. 10B illustrate the connector receptacle of FIG. 9 when no card is inserted.

Examples of different cards being inserted into connector receptacle 900 utilizing the two cam designs described above are shown in the following figures. FIG. 10A, FIG. 11A, and FIG. 12A can show the operation of connector receptacle 900 when cam 952 and spring plate 962 are implemented, while FIG. 10B, FIG. 11B, and FIG. 12B can show the operation of connector receptacle 900 when cam 1052 is implemented and spring plate 962 is omitted.

Figure 10B:
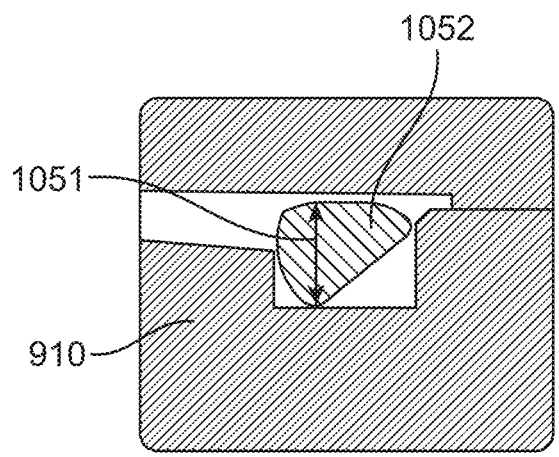
Figure 11A:
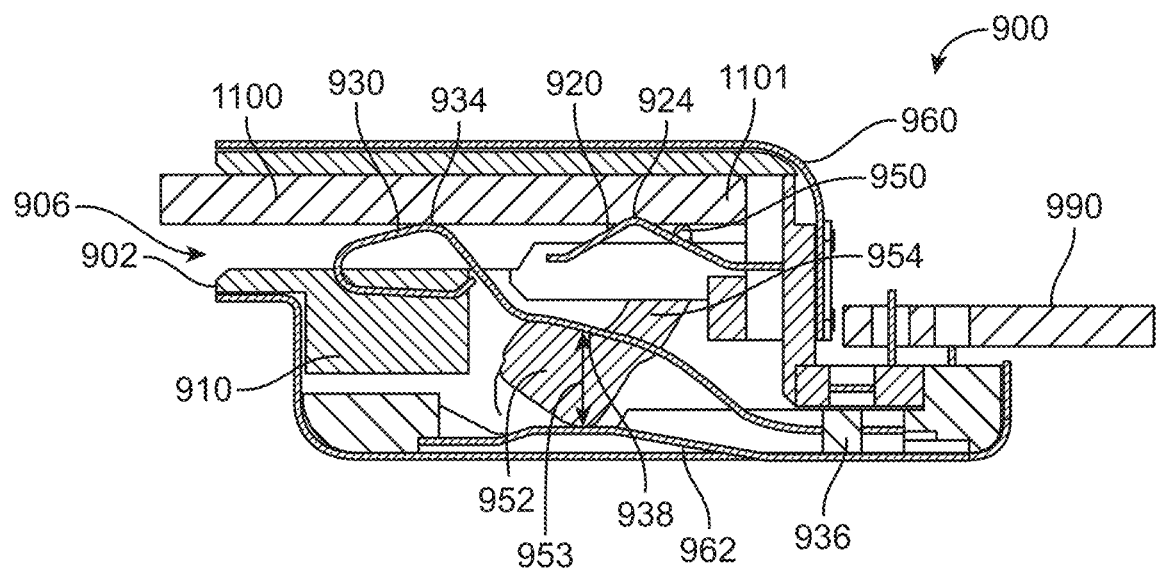
FIG. 11A and FIG. 11B illustrate the connector receptacle of FIG. 9 when a narrow card is inserted.

FIG. 10A and FIG. 10B illustrate versions of connector receptacle of FIG. 9 when no card is inserted. In FIG. 10A, connector receptacle 900 can include housing 910 having passage 906 forming front opening 902. Housing 910 can be shielded by shield 960. Housing 910 can support first row of contacts 920 and second row of contacts 930. Contacts 920 can include contacting portions 924. Contacts 930 can include contacting portions 934. Contacting portions 924 and contacting portions 934 can form electrical connections on card 1100 (shown in FIG. 11) when card 1100 is fully inserted into connector receptacle 900. Contacts 930 can be supported and fixed in place by housing 936. Contacts 930 can terminate in through-hole contacting portions 932, which can be soldered to openings in board 990.

Contact protection mechanism 950 can move contact portions 938 of contacts 930. Since contacts 930 are fixed at a first end by housing 936 and board 990, this movement can cause contacting portions 934 to move. When no card 1100 is inserted in passage 906, contact portions 938 can a apply a force to cam 952, thereby causing cam 952 to rotate counterclockwise as drawn. This can position lever 954 in passage 906. This can also orient cam 952 such that its narrow dimension 951 can be between contact portion 938 and spring plate 962. This can allow contacting portions 934 to be protected by housing 910 and out of passage 906.

In FIG. 10B, cam 1052 can be located in housing 910. In these and other embodiments of the present invention, cam 1052 can be located partially in housing 910 and held in place by spring plate 962 (shown in FIG. 9.) Cam 1052 can be oriented such that its narrow dimension 1051 is between contact portions 938 and housing 910.

Figure 11B:
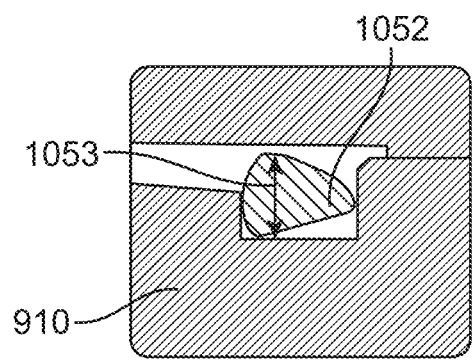
Figure 12A:
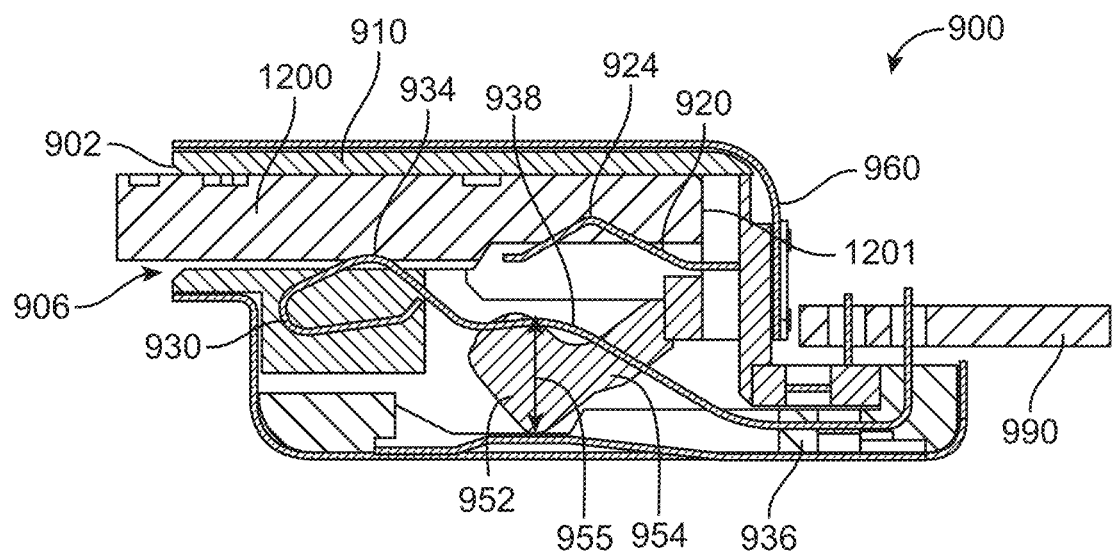
FIG. 12A and FIG. 12B illustrate the connector receptacle of FIG. 9 when a thick card is inserted.

FIG. 11A and FIG. 11B illustrate the connector receptacle of FIG. 9 when a narrow card is inserted. In FIG. 11A, connector receptacle 900 can include housing 910 having passage 906 forming front opening 902. Housing 910 can be shielded by shield 960. Housing 910 can support first row of contacts 920 and second row of contacts 930. Contacts 920 can include contacting portions 924. Contacts 930 can include contacting portions 934. Contacting portions 924 and contacting portions 934 can form electrical connections on card 1100 when card 1100 is fully inserted into connector receptacle 900.

Contact protection mechanism 950 can move contact portions 938 of contacts 930. Since contacts 930 are fixed at a first end by housing 936 and board 990, this movement can cause contacting portions 934 to move. As card 1100 is inserted in passage 906, leading edge 1101 of card 1100 can engage lever 954 of contact protection mechanism 950. This can cause cam 952 to rotate clockwise as drawn. Card 1100 can push lever 954 at least partially out of passage 906. This can also orient cam 952 such that a first wide dimension 953 is between contact portions 938 and spring plate 962. This can allow contacting portions 934 to be lifted into passage 906 where they can form electrical connections with contacts (not shown) on card 1100.

In FIG. 11B, cam 1052 can be located in housing 910. In these and other embodiments of the present invention, cam 1052 can be located partially in housing 910 and held in place by spring plate 962 (shown in FIG. 9.) Cam 1052 can be oriented such that its wide dimension 1053 is between contact portions 938 and housing 910.

Figure 12B:
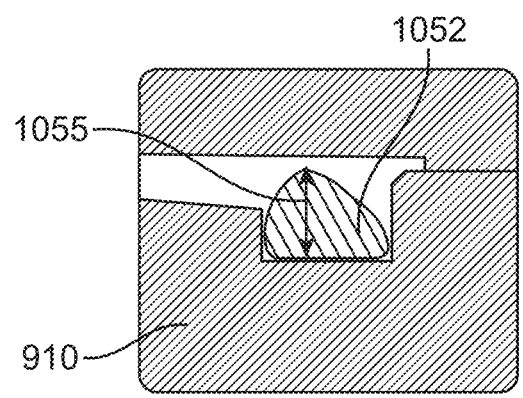

FIG. 12A and FIG. 12B illustrate the connector receptacle of FIG. 9 when a thick card is inserted. In FIG. 12A, connector receptacle 900 can include housing 910 having passage 906 forming front opening 902. Housing 910 can be shielded by shield 960. Housing 910 can support first row of contacts 920 and second row of contacts 930. Contacts 920 can include contacting portions 924. Contacts 930 can include contacting portions 934. Contacting portions 924 and contacting portions 934 can form electrical connections on card 1200 when card 1200 is fully inserted into connector receptacle 900.

Contact protection mechanism 950 can move contact portions 938 of contacts 930. Since contacts 930 can be fixed at a first end by housing 936 and board 990, this movement can cause contacting portions 934 to move. As card 1200 is inserted in passage 906, leading edge 1201 of card 1200 can engage lever 954 of contact protection mechanism 950. This can cause cam 952 to clockwise as drawn. Card 1200 can push lever 954 out of passage 906. This can also orient cam 952 such that a second wide dimension 955 can be between contact portions 938 and spring plate 962. This can allow contacting portions 934 of contacts 930 to be lifted into passage 906 where they can form electrical connections with contacts (not shown) on card 1200.

In FIG. 12B, cam 1052 can be located in housing 910. In these and other embodiments of the present invention, cam 1052 can be located partially in housing 910 and held in place by spring plate 962 (shown in FIG. 9.) Cam 1052 can be oriented such that its intermediate dimension 1055 is between contact portions 938 and housing 910.

In these and other embodiments of the present invention, some or all of click module 300 and contact protection mechanism 950 can be combined. For example plunger 310 of click module 300 can be used in place of lever 954 to turn cam 952 to lift contacts 930 in connector receptacle 200 while still deforming deflecting element 320. Either click module 300 (shown in FIG. 7) or contact protection mechanism 950 can be used as an insertion detection mechanism. For example, a first electrode (not shown) can be connected to deflecting element 320 (shown in FIG. 7.) A second electrode (not shown) can be attached to housing 720 (shown in FIG. 7) of click module 300 or elsewhere, where the second electrode can physically contact deflecting element 320 when deflecting element 320 is deflected by plunger 310 (shown in FIG. 7.) A short or connection between the first electrode and second electrode can be detected when the deflecting element 320 is deflected by plunger 310, thereby providing an indication that card 500 (shown in FIG. 5) has been fully inserted.

The components of these connector receptacles 200 and connector receptacles 900 can be formed of various materials. The portions of connector receptacle 900 shown here can be formed in the same or similar manner and of the same or similar materials as connector receptacle 200. For example, contacts 220, contacts 230, contacts 920, contacts 930, shield 260, shield 960, spring plate 962, shield 710, deflecting element 320 and their constituent parts and other conductive portions of connector receptacle 200 and connector receptacle 900 can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as housing 210, housing 720, housing 910, plunger 310, contact protection mechanism 950, and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesives, such as adhesive layer 680, can be a pressure sensitive adhesive, heat activated film, polyimide film, or other adhesive. Board 990 can be a flexible circuit board or printed circuit board. Board 990 can be formed of FR-4 or other material.

Embodiments of the present invention can provide connector receptacles that can be located in, and can connect to, various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These connector receptacles can provide pathways for signals and power for cards or other modules, such as Ultra-High-Speed II Secure Digital cards, Secure Digital (SD) cards, Secure Digital High Capacity cards, Secure Digital Extended Capacity cards, Secure Digital Ultra-High-Capacity I cards, Secure Digital Ultra-High-Capacity II cards, memory sticks, compact flash cards, communication modules, and other devices and modules that have been developed, are being developed, or will be developed in the future. For example, connector receptacles 200 and 900 can be an SD card connector. These connector receptacles can provide pathways for signals that are compliant with various standards such as Universal Serial Bus, High-Definition Multimedia Interface, Digital Visual Interface, Ethernet, DisplayPort, Thunderbolt, Lightning, Joint Test Action Group, test-access-port, Directed Automated Random Testing, universal asynchronous receiver/transmitters, clock signals, power signals, and other types of standard, non-standard, and proprietary interfaces and combinations thereof that have been developed, are being developed, or will be developed in the future. Embodiments of the present invention can also provide connector inserts that can be connected into connector receptacles.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:
    a housing having a passage forming a front opening, the front opening and passage configured to accept a card;
    a first plurality of contacts supported by the housing, each of the first plurality of contacts having a contacting portion in the passage for forming an electrical connection with a corresponding contact in a second plurality of contacts on the card when the card is inserted in the passage; and
    a click module located at an end of the passage opposite the front opening, the click module comprising:
    a deflecting element; and
    a plunger to deflect the deflecting element when the card is fully inserted in the passage.

2. The connector receptacle of claim 1 wherein the plunger comprises a plunger head to engage the deflecting element, a first handle having a first end attached to the plunger head and a second end attached to a first axel, wherein the plunger rotates about the first axel.

3. The connector receptacle of claim 2 wherein the deflecting element comprises a dome spring.

4. The connector receptacle of claim 3 wherein when the card inserted into the passage engages the click module, the plunger rotates about the first axel.

5. The connector receptacle of claim 4, wherein as the plunger rotates about the first axel, the plunger head pushes into the deflecting element, deforming the deflecting element from an original position to a deflected position, thereby generating audible feedback indicating that the card has been fully inserted.

6. The connector receptacle of claim 5 wherein as the card is removed, the deflecting element returns to the original position, thereby generating audible feedback indicating that the card has been removed.

7. The connector receptacle of claim 6 wherein the plunger further comprises a second handle having a first end attached to the plunger head and a second end attached to a second axel, wherein the first axel and the second axel are aligned.

8. The connector receptacle of claim 6 wherein the click module further comprises a housing supporting the plunger and a shield, wherein the shield comprises an opening for the plunger head such that the plunger head is engaged by the card when the card is inserted into the passage.

9. The connector receptacle of claim 6 wherein the card is a memory card.

10. The connector receptacle of claim 6 wherein the card is a Secure Digital card.

11. A connector receptacle comprising:
a housing having a passage forming a front opening, the front opening and passage configured to accept a card;
a first plurality of contacts supported by the housing, each of the first plurality of contacts having a contacting portion for forming an electrical connection with a corresponding contact in a second plurality of contacts on the card when the card is inserted in the passage; and
a contact protection mechanism comprising:
a cam engaging each of the first plurality of contacts; and
a lever having a first end attached to the cam and a second end in the passage.

12. The connector receptacle of claim 11 wherein the contact protection mechanism positions the contacting portions out of the passage when the card is not inserted in the passage and moves the contacting portions into the passage as the card is inserted.

13. The connector receptacle of claim 12 wherein the cam has an oblong shape such that it has a narrow dimension and a wider dimension.

14. The connector receptacle of claim 13 wherein the first plurality of contacts engages the narrow dimension of the cam when a card is not inserted into the passage.

15. The connector receptacle of claim 14 wherein as the card is inserted into the passage, the card engages the lever, thereby turning the cam such that the first plurality of contacts engages the wider dimension of the cam.

16. The connector receptacle of claim 15 further comprising a second plurality of contacts supported by the housing, each of the second plurality of contacts having a contacting portion for forming an electrical connection with a corresponding contact in a second plurality of contacts on the card.

17. The connector receptacle of claim 16 further comprising a lubricating layer over a portion of the cam.

18. The connector receptacle of claim 16 further comprising a shield substantially around the housing.

19. The connector receptacle of claim 16 wherein the card is a memory card.

20. The connector receptacle of claim 16 wherein the card is a Secure Digital card.

* * * * *